United States Patent [19]
Zeitler et al.

[11] Patent Number: 5,751,120
[45] Date of Patent: May 12, 1998

[54] DC OPERATED ELECTRONIC BALLAST FOR FLUORESCENT LIGHT

[75] Inventors: Walter Zeitler, Boynton Beach, Fla.; Ernst Gabriel, Pocking, Germany

[73] Assignee: Siemens Stromberg-Carlson, Boca Raton, Fla.

[21] Appl. No.: 516,782

[22] Filed: Aug. 18, 1995

[51] Int. Cl.$^6$ ................................................. H05B 41/36
[52] U.S. Cl. ........................... 315/307; 315/DIG. 7; 315/324; 315/225; 315/308; 363/124
[58] Field of Search .......................... 315/307, 289, 315/290, DIG. 7, 324, 225, 308; 363/124, 26; 323/207

[56] References Cited

U.S. PATENT DOCUMENTS 3,767,970  10/1973  Collins ................................. 315/241
4,132,925  1/1979   Schmutzer et al. ................... 315/208
5,111,118  5/1992   Fellows et al. ....................... 315/307

Primary Examiner—Robert Pascal
Assistant Examiner—Arnold Kinkead

[57] ABSTRACT

A device for operating lamps, such as fluorescent lamps includes an input protection circuit, a filter, a DC to DC converter, a power output stage, a lamp connecting circuit and a control circuit. The control circuit includes a pulse width modulator, a multivibrator and a start/stop controller. The pulse width modulator varies the duty cycle of a control signal supplied to the DC to DC converter based on a feedback signal from the DC to DC converter. The multivibrator assists in the control of the DC to DC converter. The start/stop controller initiates the operation of the power output stage when an output of the DC to DC converter reaches a predetermined level and halts the operation of the power output stage if a failure is detected.

22 Claims, 2 Drawing Sheets 5,751,120

1

DC OPERATED ELECTRONIC BALLAST FOR FLUORESCENT LIGHT

BACKGROUND OF THE INVENTION

1. Field of the Invention

The present invention concerns a device, supplied with a DC voltage, for operating (starting and ballasting) light bulbs and in particular, fluorescent lamps.

2. Related Art

A fluorescent lamp is a container (e.g., a transparent or translucent envelope) in which gas (e.g., mercury-argon) is excited, either by a DC discharge (arcing) or by an RF excitation. This in turn creates ultra-violet or violet radiation which excites a phosphor coating on the glass envelope. This phenomenon is known as phosphorescence. The excitation of the gas also causes the electrons of the gas to move to higher energy orbits. When the atoms subsequently relax to lower energy states, they emit energy, some of which is light.

Typically, fluorescent light bulbs are operated by ballasts having an AC input voltage. Unfortunately, AC operated ballasts have some disadvantages. For example, the phase of the AC input voltage can shift. Consequently, phase shift compensation circuitry is required. Also, if AC operated ballasts are to be used in an emergency lighting application, DC voltage from storage batteries (or some other alternative voltage source) must first be converted to AC. Further, AC operated ballasts can be damaged due to transient spikes and longitudinal currents caused by AC power load balance switching and lighting.

Furthermore, fluorescent bulbs using DC discharge excitation and operated with AC power generate and radiate RF (radio frequency) interference and are inefficient. Specifically, as the AC power reverses polarity during a portion of each cycle, the arc (DC discharge) between the electrodes of the fluorescent tube is extinguished. Thus, the tube must be restarted for current flow in the opposite direction. RFI is generated when the arc (DC discharge) between the electrodes of the gaseous discharge tube begins to restrike. Since the voltage required to restart (generate an arc) the fluorescent tube is greater than the voltage required to maintain the operation of the lamp, such ballasts are also inefficient.

DC operated ballasts are known. For example, U.S. Pat. No. 3,767,970 (hereinafter referred to as "the '970 patent") describes a circuit for improving turn-on and extinction of a gaseous discharge lamp.

U.S. Pat. No. 4,132,925 (hereinafter referred to as "the '925 patent") describes a ballast having a switching transistor, a base drive circuit, an oscillator, a current sensing and limiting device, and a starting pulse generator. The oscillator is initiated by a voltage pulse generated by the starting pulse circuit and applies a clock signal to the base drive circuit. The base drive circuit generates a switching control signal which is applied to the base of the series pass transistor. The current sensing and limiting device provides a control signal to the base drive circuit to limit the current flowing through the series pass transistor. When the starting pulse generator detects that the potential of its output rises to a level close to that at the input line (which is coupled with the collector of the series pass transistor), it determines that the lamp is non-ionized or non-conductive and consequently generates a voltage pulse to ignite the lamp. Once the lamp is ignited, the potential applied to it drops.

Unfortunately, these known ballasts are apparently not highly efficient and not specially designed to operate optimally at 48 V DC (i.e., at the same voltage level as the power source used for central office switching). These known ballasts do not monitor the lamp supply voltage so that the starting of the lamps is optimal and only possible when both lamps are properly installed. Further, these known ballasts do not disconnect the lamp power supply (e.g., by halting an oscillation of a supply voltage) in the event of a lamp failure (e.g., if the voltage runs up due to a defective lamp or if a short circuit exists).

Finally, these ballasts apparently supply the light tubes with a DC current. Although this eliminates flicker and only requires a single electrode of the lamp tube to be warmed, the constant polarity of the electrodes of the gas tube may cause gas separation (i.e., gas ions of a positive charge migrating towards one electrode while gas ions of a negative charge migrating towards the other electrode) thereby shortening the bulb life and/or affecting the color retention of the bulb. Further DC discharge ballasts cannot easily dim fluorescent lamps over a wide range of light levels.

SUMMARY OF THE INVENTION

The present invention overcomes the above mentioned problems of the known DC ballasts by providing an improved device supplied with a DC input for operating a lamp at high frequency. The improved device has an input protection circuit, a filter, a DC to DC converter, a power output stage, a lamp connecting circuit, and a control circuit.

The input protection circuit has first and second input terminals, across which an input voltage source is provided, and a pair of output terminals. The output terminals are protected from overvoltages and polarity reversals at the first and second input terminals.

In a preferred embodiment of the present invention, the input protection circuit includes a series connection of a fuse and a diode arranged between the first input terminal and a first of the pair of output terminals. The input protection circuit further includes a zener diode having its cathode coupled with the cathode of the diode of the series connection and its anode coupled with both the second input terminal and a second of the pair of output terminals. The zener diode is preferably a transorb diode having a reverse current at about 75 volts.

The filter has a pair of inputs coupled with the pair of outputs of the input protection circuit and has a first output terminal and a second output terminal across which a filtered DC voltage is provided. The first output terminal of the filter is at a higher potential than the second output terminal of the filter.

The filter is preferably a double Π filter which includes a plurality of inductors and capacitors.

The DC to DC converter has a first input coupled with the first output of the filter, a second input for receiving a signal which controls the DC to DC conversion, a first output provided with a stepped-up DC voltage resulting from the DC to DC conversion, and a second output providing a feedback control signal.

In a preferred embodiment of the present invention, the DC to DC converter includes a series connection of a inductor and a diode arranged between its first input and its first output. The DC to DC converter further includes a transistor. The source of the transistor is coupled at a node between the inductor and the anode of the diode. The drain of the transistor is coupled with the second output of the DC to DC converter. The gate of the transistor is coupled with the second input of the DC to DC converter. Lastly, the DC to DC converter includes a resistor. A first end of the resistor is coupled with the second output of the DC to DC converter and a second end of the resistor is coupled with the second output terminal of the filter.

The output of the DC to DC converter is preferably about 350 volts DC.

The power output stage provides a high frequency lamp drive output. It has a first input coupled with the first output of the DC to DC converter, a second input provided with a start control signal, a first output, a second output, and a third output. The third output of the power output stage provides a signal based on a voltage provided at the first output of the DC to DC converter.

The lamp connecting circuit provides power to at least two gaseous discharge lamps. It has a first input coupled with the first output of the power output stage and a second input coupled with the second output of the power output stage.

In a preferred embodiment of the present invention, the lamp connecting circuit includes a first lamp connector, a second lamp connector, a first capacitor, a second capacitor, and a third capacitor. The first lamp connector has a first end and a second end. The first end includes a first terminal coupled with the first input of the lamp connecting circuit, and a second terminal. The second end has a first terminal and a second terminal. Similarly, the second lamp connector has a first end and a second end. The first end of the second lamp connector includes a first terminal coupled with the second input of the lamp connecting circuit, and a second terminal. The second end of the second lamp connector has a first terminal and a second terminal The first terminal of the second end of the second lamp connector is coupled with the first terminal of the second end of the first lamp connector. The first capacitor is coupled between the second terminals of the first and second ends of the first lamp connector. The second capacitor is coupled between the second terminals of the first and second ends of the second lamp connector. The first and second capacitors of the lamp connecting circuit form part of the self-pulsating circuit of the power output stage discussed below. The third capacitor is coupled between the second terminal of the second end of the first lamp connector and the second output terminal of the filter.

The control circuit includes a pulse width modulator, a multivibrator, and a safety disconnect and starting device. The pulse width modulator has an output providing a fixed frequency pulse train. This output is coupled with the second input of the DC to DC converter. The pulse width modulator also includes an input coupled with the second output of the DC to DC converter. The duty cycle of the fixed frequency pulse train provided by the pulse width modulator is varied based on the feedback control signal provided from the second output of the DC to DC converter. The multivibrator is capacitively coupled with the second input of the DC to DC converter. The multivibrator has almost no effect on the output of the pulse width modulator when the first output of the DC to DC converter reaches a predetermined voltage. The multivibrator is also coupled with the first output terminal of the filter via a diode. The safety disconnect and starting device has an input coupled with the third output of the power output stage and an output coupled with the second input of the power output stage. It provides a start control signal based on its input.

A preferred embodiment of the device of the present invention also includes a measurement device having an output which provides a signal indicative of a voltage applied to the each of the at least two gaseous discharge lamps. The safety disconnect and starting device includes a second input coupled with the output of the measurement device. The safety disconnect and starting device also includes a second output for providing a stop signal to a third input of the power output stage based on the signal indicative of a voltage applied to the each of the at least two gaseous discharge lamps applied at the second input of the safety disconnect and starting device.

In a preferred embodiment of the present invention, the power output stage includes a self pulsating circuit which includes a half bridge control. The self pulsating circuit provides a high frequency lamp voltage to each of the first and second outputs of the power output stage. The safety disconnect and starting device initiates the provision of the high frequency lamp voltages by the self pulsating circuit by providing a start signal on its first output based on its first input. The safety disconnect and starting device ceases the provision of the high frequency lamp voltages by the self pulsating circuit by providing a stop signal on its second output based on its second input.

In a refined embodiment of the present invention, the self pulsating oscillator of the power output stage includes a transformer, a bridge connection of two transistors, first and second inductors and first and second capacitors. A first end of the primary winding of the transformer is coupled with the second input of the power output stage and a second end of the primary winding is coupleable with the second output terminal of the filter. The bridge connection includes a first transistor and a second transistor. The collector of the first transistor is coupled with the first input of the power output stage. The base of the first transistor is coupled with a first end of the secondary of the transformer. The emitter of the first transistor is coupled with the collector of the second transistor and with a center tap of the secondary of the transformer. The base of the second transistor is coupled with the second input of the power output stage. Finally, the emitter of the second transistor is coupled with the second output terminal of the filter. The first inductor has a first end coupled with a second end of the secondary of the transformer and a second end coupled with the first output of the power output stage. Similarly, the second inductor has a first end coupled with the second end of the secondary of the transformer and a second end coupled with the second output of the power output stage. The first and second inductors are coupled with the first and second capacitors via the lamp connecting circuit when lamps are installed.

The self-pulsating circuit preferably has a resonance curve which builds up slowly.

In a refined embodiment of the present invention, the safety disconnect and starting device ceases the provision of the high frequency lamp voltages by the self pulsating circuit by providing a stop signal if either a lamp disconnect or a lamp voltage acceleration is detected based on its second input. The safety disconnect and starting device will also initiate the provision of the high frequency lamp voltages by the self pulsating circuit by providing a start signal if the voltage provided at the first output of the DC to DC converter is determined to be at a predetermined level based on its first input In a preferred embodiment of the present invention, the pulse width modulator and the safety disconnect and starting device of the control circuit are integrated onto a single chip.

The device of the present invention is preferably operated with a DC voltage source between 40 and 60 volts, and more preferably 48 volts.

The device of the present invention advantageously: eliminates high voltage surges by appropriately filtering the input voltage and monitoring the voltage supplied to the lamp; increases lamp output while using less electricity by exciting the gas with a high frequency (e.g., RF) voltage; increases lamp life by employing lamp protection means and avoiding gas separation; increases ballast life by providing electronic ballasting; eliminates noticeable fluorescent flicker and associated stroboscopic effects by operating lamps at relatively high frequencies (e.g., RF); eliminates ballast hum; and permits the lamps to be operated with a relatively wide input voltage range (e.g., 40 V to 60 V). This last feature of the device of the present invention makes it extremely attractive for emergency lighting applications, solar powered lighting applications, applications on islands and at telephone switching centers (which use 48 V DC).

DETAILED DESCRIPTION

Figure 1:
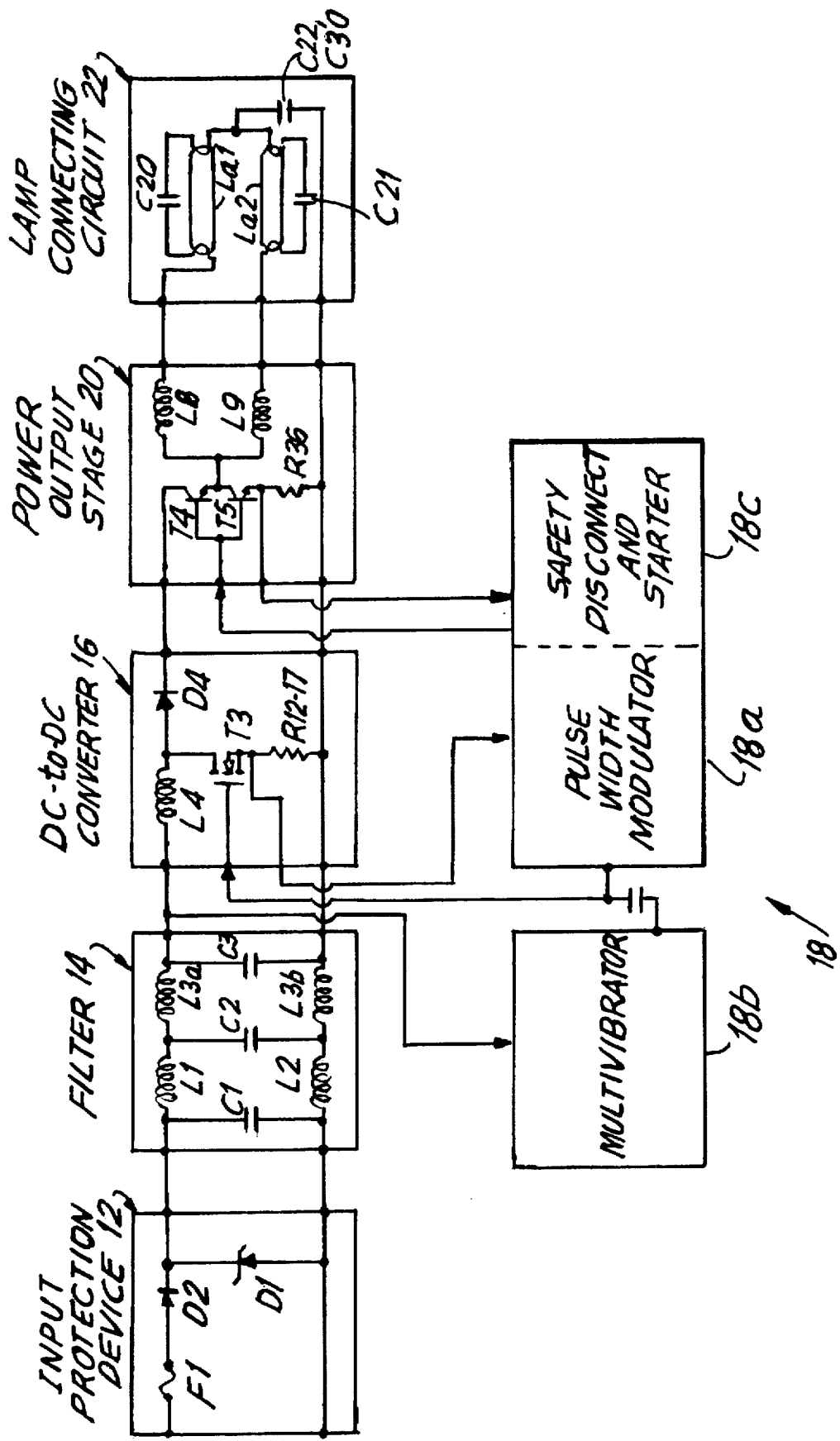
FIG. 1 is a block diagram of the DC operated electronic ballast of the present invention.
Figure 2:
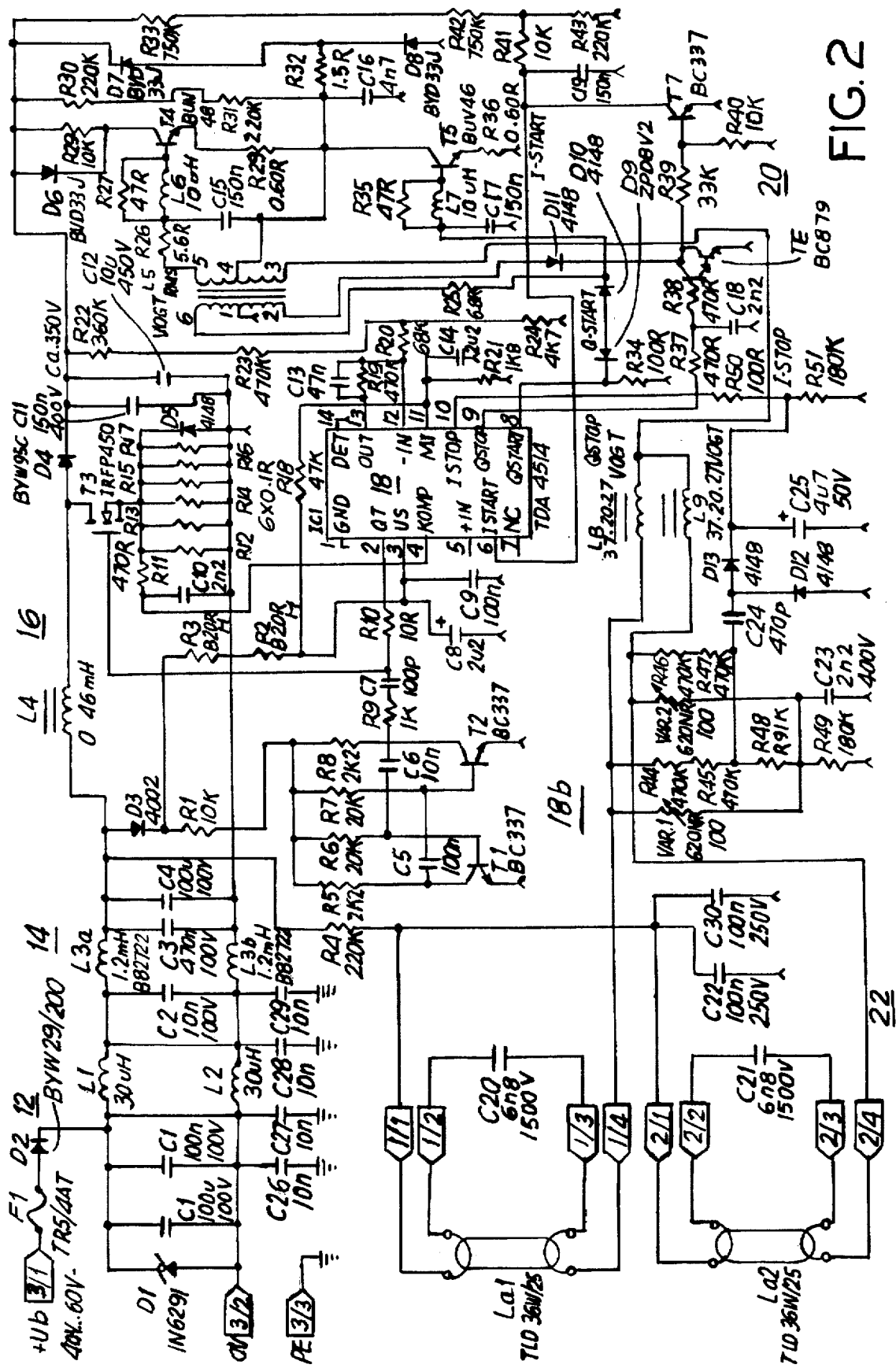
FIG. 2 is a schematic diagram of the DC operated electronic ballast of FIG. 1.

As shown in the block diagram of FIG. 1 and the schematic diagram of FIG. 2, the DC operated electronic ballast of the present invention includes an input protection device 12, a filter 14, a DC to DC converter 16, a control circuit 18, a power output stage 20 and a lamp connecting circuit 22. The operation and design of each of these components is described below.

The input protection device 12 protects the remaining components from overvoltages and reversed polarity as described below. The input protection device 12 includes a first input terminal (3/1) to be provided with the higher potential (e.g., about 40 to 60 V) of the input DC voltage and a second input terminal (3/2) to be provided with the lower potential (e.g., 0 V) of the input DC voltage. A series connection of a fuse F1 and a diode D2 is arranged between the first input terminal and a first output terminal. The second input terminal is coupled with a second output terminal. The input protection device 12 further includes a zener (or transorb) diode D1 which has an anode coupled with the second input and a cathode coupled with the cathode of the diode D2.

The zener diode D1 becomes conductive (in the reverse direction) at about 75 V. This protects the input of the ballast from surges and causes the input fuse F1 to respond by shorting the higher potential input to the lower potential input at voltages at or above 75 V. The diode D2 has a reverse voltage of 200 V, which protects the ballast from polarity reversal. Thus, even if an alternating current of up to 60 V was applied, the ballast would behave properly because the diode D2 will not conduct the negative portions of the AC voltage.

The fuse F1 may be built into the more negative input terminal to ensure a response even if a short circuit occurs away from the ballast. A predetermined circuit breaking point may be provided on an external circuit board conductor to ensure further protection from short circuits producing a current above a predetermined threshold (e.g., 15 Amps).

The filter 14 may be a double Π filter (such as a double Π L-C filter) which includes inductors L1, L2, L3a, and L3b, and capacitors C1, C2, and C3. The first section of the double Π filter removes higher energy, low frequency, noise and the second section of the double Π filter removes lower energy, high frequency, noise. Thus, the double Π filter 14 has a very broadband filtering characteristic and ensures a low spectrum of noise. Consequently, the DC network is not stressed.

As shown in FIG. 2, the filtered DC supply voltage provided by the filter 14 is applied to an electrode of each of the fluorescent tubes (La1, La2) via resistor R4. This voltage may be used to warm the electrode of each of the fluorescent tubes (La1, La2) to facilitate starting.

The DC to DC converter 16 is based on a conventional step-up transformer and generates the high DC voltage (e.g., about 350 V DC) required to effectively operate the fluorescent lamps. By using highly permeable inductor materials, a relatively low operating (i.e., switching) frequency can be used. For example, the IC controller 18 includes a pulse width modulator 18a which can vary the pulse width (i.e., duty cycle) of a fixed frequency signal (for example 20 KHz to 30 KHz). (See e.g., output QT (pin 2 of the IC controller 18.) By varying the pulse width of the fixed frequency pulse train applied to the gate of MOSFET T3, the output of the DC to DC converter 16 can be regulated. That is, when the MOSFET T3 is blocking (i.e., open), the DC power from the filter 14 passes through the inductor L4 and the diode D4 to charge the capacitors C11 and C12. When the MOSFET T3 is conducting (i.e., closed), the DC power from the filter 14 passes through the MOSFET T3 and resistors R12–R17. When the supply MOSFET T3 conducts and draws current across the drain-source channel of the MOSFET T3, a voltage drop is created cross the resistors (R11–R17) carrying the current and a closed control loop is formed via the KOMP input (the fourth pin) of the IC controller 18 and the output QT (the second pin) of the controller IC 18. Since the operating frequency of the DC to DC converter is relatively low, its noise spectrum is also low.

The pulse width (or duty factor)of the switching signal applied to the gate of the MOSFET T3 is adjusted such that the output of the DC to DC converter attains its desired value (e.g., 350 V).

As shown in FIGS. 1 and 2, a multivibrator 18b (including T1, T2, C5, C6, and R5–R8) acts as a "forced response circuit" which ensures the provision of a pulse train as the control signal (i.e., switching signal) for the step-up transformer, even when the input signal (e.g., from a DC power supply voltage via the filter 14) is slowly rising. Thus, the multivibrator 18b provides "build up assistance" by pulsing the MOSFET T3 to build up the voltage of the DC to DC converter when a supply voltage is applied (via D3 and RI).

Capacitive coupling, via C7, of the response assistance provided by the multivibrator 18b is designed to be low enough so that regulation of the switching of the MOSFET T3 is not influenced during normal operation of the DC to DC converter (i.e., operation in which the pulse width modulator, with a closed loop, operates such that a 350 V output voltage is generated).

The use of a step-up transformer provides extremely high efficiency (about 92 percent) with a relatively inexpensive components and high power. In this instance, the power is greater than 80 Watts (i.e., enough to power 2–40 watt fluorescent lamps).

The power output stage 20 includes a self pulsating (e.g., self oscillating) circuit with half-bridge control of the florescent lamps (La1, La2). The self-pulsating circuit includes the transistors T4, T5, and the transformer L5 (facilitating the half-bridge control), and the inductors L8, L9, and the capacitors C20, C21 (forming two series resonant circuits). This self-pulsating circuit generates an alternating voltage having a high operating frequency.

The self-pulsating circuit (including T4, T5, L5, L8, L9, C20, and C21) is started by a control signal QSTART (pin 8 of the IC controller 18) from the IC controller 18 when the voltage input provided at ISTART (pin 6) of the IC controller 18 reaches a desired value. The QSTART pulse is itself applied to the fluorescent lamps (La1, La2) via the 6-1 section of the primary, and the 5-4 section of the secondary, of the transformer L5.

The self-pulsating circuit can be stopped by a control signal QSTOP (pin 9 of the IC controller 18) from the IC controller 18 if either of the lamp voltages, represented by I-STOP (pin 10 of the IC controller), is accelerating (e.g., due to a defective lamp) or if the two oscillator capacitors (C20, C21) are connected although no lamp has been inserted. The ISTOP input (pin 10) of the IC controller 18 is supplied with the subdivided (stepped down via R44, R45, and R50 or R46, R47, and R50), and rectified (via C24 and D13) lamp voltages of the fluorescent lamps (La1, La2)

The IC controller 18 continues to monitor the power supply voltage via its input ISTART (pin 6 of the IC controller 18). As discussed above, the IC controller 18 starts the "self-pulsating circuit" by applying a control signal QSTART to the base of the transistor T5, thereby starting the fluorescent lamps, only when the power supply voltage has reached its desired value. In an alternative embodiment, the input ISTART is also run across the lamp capacitors (C20, C21) such that starting is only possible if both lamps have been twisted in.

Since the progression of the resonance curves of the series resonant tank circuits (e.g., L8, C20 and L9, C21) of the self pulsating circuit is relatively flat, the voltage at the lamps (La1, La2) does not increase quickly to a high voltage. Thus, due to the lower voltage at the lamps (La1, La2), the danger of voltage becoming capacitively coupled with a hand grasping or enclosing the lamp (as could occur for example, when a lamp is being replaced while the power is on) is reduced.

The self-pulsating circuit is dimensioned to supply a load representing the load of two fluorescent lamps (e.g., 2×40 Watts). Accordingly, even very old lamps (i.e., lamps that have already reached the end of their life cycle) will start easier and with less flicker than if an individual lamp was to be started.

What is claimed is:

1. A device for operating at least two gaseous discharge lamps, the device comprising:
   a) an input protection circuit
      i) having first and second input terminals across which an input voltage source is provided, and
      ii) having a pair of output terminals which are protected from overvoltages and polarity reversals at the first and second input terminals;
   b) a filter having a pair of inputs coupled with the pair of outputs of the input protection circuit and having a first output terminal and a second output terminal across which a filtered DC voltage is provided, wherein the first output terminal of the filter is at a higher potential than the second output terminal of the filter;
   c) a DC to DC converter for performing a DC to DC conversion, the DC to DC converter having a first input coupled with the first output terminal of the filter, a second input for receiving a signal which controls the DC to DC conversion, a first output provided with a stepped-up DC voltage resulting from the DC to DC conversion, and a second output providing a feedback control signal;
   d) a power output stage for providing a high frequency lamp drive output, the power output stage having a first input coupled with the first output of the DC to DC converter, a second input provided with a start control signal, a first output, a second output, and a third output, the third output of the power output stage providing a signal based on a voltage provided at the first output of the DC to DC converter;
   e) a lamp connecting circuit for providing power to the at least two gaseous discharge lamps, the lamp connecting circuit having a first input coupled with the first output of the power output stage and a second input coupled with the second output of the power output stage; and
   f) a control circuit, the control circuit including
      i) a pulse width modulator having an output providing a fixed frequency pulse train and coupled with the second input of the DC to DC converter, and an input coupled with the second output of the DC to DC converter, wherein a duty cycle of the fixed frequency pulse train provided by the pulse width modulator is varied based on the feedback control signal provided from the second output of the DC to DC converter,
      ii) a multivibrator capacitively coupled with the second input of the DC to DC converter, and
      iii) a safety disconnect and starting device having an input coupled with the third output of the power output stage and an output coupled with the second input of the power output stage and providing a start control signal based on the input of the safety disconnect and starting device.

2. The device of claim 1 further comprising a measurement device having an output which provides a signal indicative of a voltage applied to the each of the at least two gaseous discharge lamps, wherein the power output stage includes a third input for receiving a stop control signal, and
   wherein the safety disconnect and starting device includes a second input coupled with the output of the measurement device and a second output for providing a stop signal to the third input of the power output stage based on the signal indicative of a voltage applied to the each of the at least two gaseous discharge lamps applied at the second input of the safety disconnect and starting device.

3. The device of claim 2 wherein the power output stage includes a self pulsating circuit having a half bridge control, the self pulsating circuit providing a high frequency lamp voltage to each of the first and second outputs of the power output stage, wherein the safety disconnect and starting device initiates the provision of the high frequency lamp voltages by the self pulsating circuit by providing a start signal on the first output of the safety disconnect and starting device based on the first input of the safety disconnect and starting device, and
   wherein the safety disconnect and starting device ceases the provision of the high frequency lamp voltages by the self pulsating circuit by providing a stop signal on the second output of the safety disconnect and starting device based on the second input of the safety disconnect and starting device.

4. The device of claim 3 wherein the safety disconnect and starting device ceases the provision of the high frequency lamp voltages by the self pulsating circuit by providing a stop signal if at least one of a lamp disconnect and a lamp voltage acceleration is detected based on the second input of the safety disconnect and starting device.

5. The device of claim 3 wherein the safety disconnect and starting device initiates the provision of the high frequency lamp voltages by the self pulsating circuit by providing a start signal if the voltage provided at the first output of the DC to DC converter is determined to be at a predetermined level based on the first input of the safety disconnect and starting device.

6. The device of claim 1 wherein the DC to DC converter includes a series connection of a inductor and a diode arranged between the first input and the first output of the DC to DC converter, a transistor having a source coupled at a node between the inductor and the anode of the diode, a drain coupled with the second output of the DC to DC converter, and a gate coupled with the second input of the DC to DC converter, and a resistor having a first end coupled with the second output of the DC to DC converter and a second end coupled with the second output terminal of the filter.

7. The device of claim 1 wherein the filter is a double Π filter.

8. The device of claim 7 wherein the double Π filter includes a plurality of inductors and capacitors.

9. The device of claim 3 wherein the self pulsating oscillator of the power output stage includes:
   i) a transformer having a primary winding and a secondary winding, a first end of the primary winding being coupled with the second input of the power output stage and a second end of the primary winding being coupleable with the second output terminal of the filter;
   ii) a bridge connection including a first transistor having an emitter, a collector, and a base, and a second transistor having an emitter, a collector, and a base, the collector of the first transistor being coupled with the first input of the power output stage, the base of the first transistor being coupled with a first end of the secondary of the transformer of the power output stage, the emitter of the first transistor being coupled with the collector of the second transistor and with a center tap of the secondary of the transformer of the power output stage, the base of the second transistor being coupled with the second input of the power output stage, and the emitter of the second transistor being coupled with the second output terminal of the filter;
   iii) a first inductor having a first end coupled with a second end of the secondary of the transformer of the power output stage and a second end coupled with the first output of the power output stage; and
   iv) a second inductor having a first end coupled with the second end of the secondary of the transformer of the power output stage and a second end coupled with the second output of the power output stage.

10. The device of claim 9 wherein the lamp connecting circuit includes:
    i) a first lamp connector having a first end including a first terminal coupled with the first input of the lamp connecting circuit and a second terminal and a second end having a first terminal and a second terminal;
    ii) a second lamp connector having a first end including a first terminal coupled with the second input of the lamp connecting circuit and a second terminal and a second end having a first terminal and a second terminal, the first terminal of the second end of the second lamp connector being coupled with the first terminal of the second end of the first lamp connector;
    iii) a first capacitor coupled between the second terminals of the first and second ends of the first lamp connector;
    iv) a second capacitor coupled between the second terminals of the first and second ends of the second lamp connector; and
    v) a third capacitor coupled between the second terminal of the second end of the first lamp connector and the second output terminal of the filter.

11. The device of claim 1 wherein the lamp connecting circuit includes:
    i) a first lamp connector having a first end including a first terminal coupled with the first input of the lamp connecting circuit and a second terminal and a second end having a first terminal and a second terminal;
    ii) a second lamp connector having a first end including a first terminal coupled with the second input of the lamp connecting circuit and a second terminal and a second end having a first terminal and a second terminal, the first terminal of the second end of the second lamp connector being coupled with the first terminal of the second end of the first lamp connector;
    iii) a first capacitor coupled between the second terminals of the first and second ends of the first lamp connector;
    iv) a second capacitor coupled between the second terminals of the first and second ends of the second lamp connector; and
    v) a third capacitor coupled between the second terminal of the second end of the first lamp connector and the second output terminal of the filter.

12. The device of claim 1 wherein the input protection circuit includes:
    i) a series connection of a fuse a diode arranged between the first input terminal and a first of the pair of output terminals; and
    ii) a zener diode having its cathode coupled with the cathode of the diode of the series connection of the input protection circuit and its anode coupled with both the second input terminal and a second of the pair of output terminals.

13. The device of claim 12 wherein the zener diode is a transorb diode having a reverse current at about 75 volts.

14. The device of claim 1 wherein the multivibrator of the control circuit is coupled with the first output terminal of the filter via a diode.

15. The device of claim 1 wherein the pulse width modulator and the safety disconnect and starting device of the control circuit are integrated onto a single chip.

16. The device of claim 1 wherein the input voltage source is a DC voltage source.

17. The device of claim 1 wherein the input voltage source is between 40 and 60 volts DC.

18. The device of claim 1 wherein the input voltage source is 48 volts DC.

19. The device of claim 1 wherein the multivibrator has almost no effect on the output of the pulse width modulator when the first output of the DC to DC converter reaches a predetermined voltage.

20. The device of claim 19 wherein the predetermined voltage is approximately 350 volts DC.

21. The device of claim 3 wherein the self-pulsating circuit has a resonance curve which builds up slowly.

22. A device for operating at least two gaseous discharge lamps from a supplied DC voltage, the device comprising:
    a) a DC to DC converter for performing a DC to DC conversion, the DC to DC converter having a first input coupled with the supplied DC voltage, a second input for receiving a signal which controls the DC to DC conversion, a first output provided with a stepped-up DC voltage resulting from the DC to DC conversion, and a second output providing a feedback control signal;

b) a power output stage for providing a high frequency lamp drive output, the power output stage having a first input coupled with the first output of the DC to DC converter, a second input provided with a start control signal, a first output, a second output, and a third output, the third output of the power output stage providing a signal based on a voltage provided at the first output of the DC to DC converter;

c) a lamp connecting circuit for providing power to the at least two gaseous discharge lamps, the lamp connecting circuit having a first input coupled with the first output of the power output stage and a second input coupled with the second output of the power output stage; and d) a control circuit, the control circuit including i) a pulse width modulator having an output providing a fixed frequency pulse train and coupled with the second input of the DC to DC converter, and an input coupled with the second output of the DC to DC converter, wherein a duty cycle of the fixed frequency pulse train provided by the pulse width modulator is varied based on the feedback control signal provided from the second output of the DC to DC converter, ii) a multivibrator capacitively coupled with the second input of the DC to DC converter, and iii) a safety disconnect and starting device having an input coupled with the third output of the power output stage and an output coupled with the second input of the power output stage and providing a start control signal based on the input of the safety disconnect and starting device.

* * * * *